Oct. 3, 1967

P. F. DUNNE 3,345,547

STEP MOTOR CONTROL SYSTEM INCLUDING A THREE STAGE
ENERGIZATION FOR EACH STEP

Filed Jan. 21, 1965

PETER F. DUNNE
INVENTOR.

BY *Stuart Lubitz*
ATTORNEY

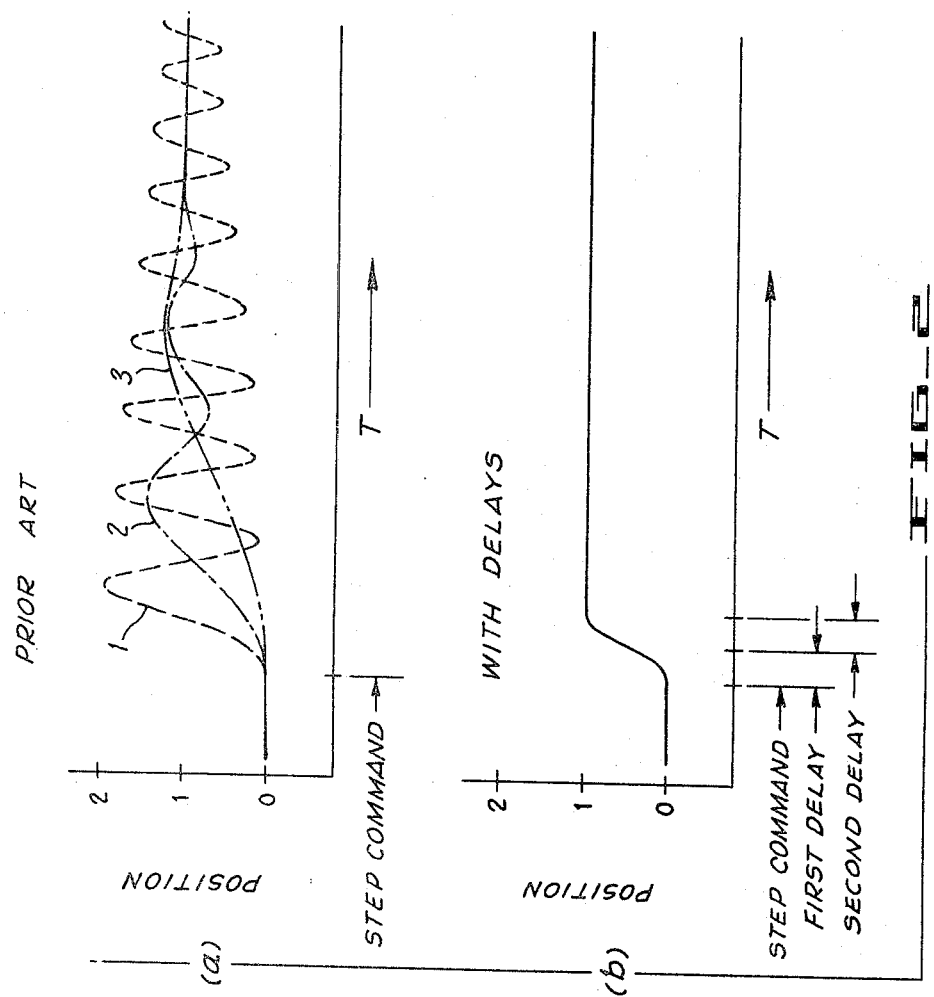

United States Patent Office 3,345,547
Patented Oct. 3, 1967

3,345,547
STEP MOTOR CONTROL SYSTEM INCLUDING A THREE STAGE ENERGIZATION FOR EACH STEP
Peter F. Dunne, San Francisco, Calif., assignor to Ampex Corporation, Redwood City, Calif., a corporation of California
Filed Jan. 21, 1965, Ser. No. 426,944
8 Claims. (Cl. 318—138)

ABSTRACT OF THE DISCLOSURE

Apparatus for stepping an incremental motor without substantial oscillation thereof utilizing means for sensing the state of the motor windings, and logic means for energizing the motor in a selected direction by supplying the windings with a first energization signal to start the motor, by then decelerating the motor with a second energization signal applied in a reverse direction and then resupplying the first energization signal to the motor to lock same in its new position.

---

Figure 1:
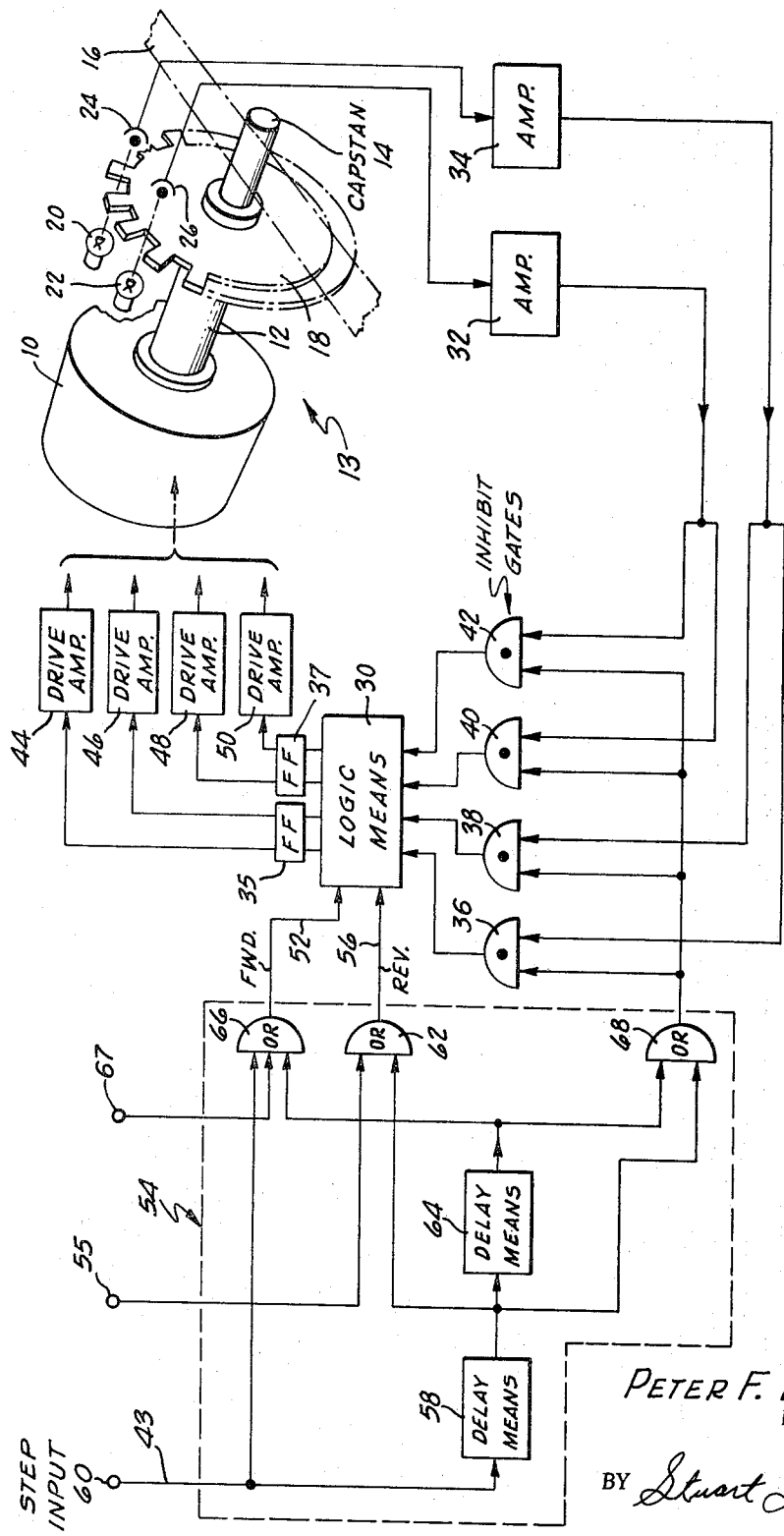

In systems employing incremental motors, the stepping from one position to another is accomplished by changing the energization state of the windings which results in the motor output shaft moving in a first direction to a new position. The energization state change can be accomplished by applying a given waveform or pulse to different windings, by applying a constant current or voltage level to different windings or by similar means. In any event, the resulting movement of the output shaft terminates with an oscillation about its new position. This oscillation increases the incrementing period, that is, the period required to move the output shaft of the motor from one stable position to a new stable position. A stable position is achieved when the oscillation of the driven member or recording media has reached a magnitude that does not induce position errors.

In order to improve reliability, minimize the oscillations, increase the incrementing rate and shorten the incrementing period, prior art systems have employed brakes on the motor shaft which reduces the maximum stepping rate rather than increasing this rate. Other prior art systems have employed sealed motors filled with silicone fluid which is an expensive system or a viscous damper attached to the output shaft which is cumbersome and minimal in effect.

To minimize the oscillatory mode of operation, improve reliability, increase the incrementing rate and decrease the increment period a new and novel control system for operating the motor has been invented. This system in a single increment period first energizes the motor to accelerate in a first direction, then energizes the motor to accelerate in a second or opposite direction and finally terminates the movement of the output shaft by repeating the first energization. This energization of the incremental motor first causes the motor output shaft to move toward its new position and then causes it to decelerate and tend to reverse its direction of movement. When the output shaft approaches its new position, its velocity approaches zero and the reestablishment of the original energization locks the output shaft in its new position. This control of motor energization attains all of the system goals while adding a minimum of complexity and cost.

Briefly, the structure of the invention comprises a logic means for energizing said motor to move or accelerate in a first direction when supplied with a first energization signal and for energizing said motor to accelerate in a second direction when supplied with a second energization signal, means for applying a first energization signal, a second energization signal and a first energization signal in sequence when the motor is to increment in the first direction, whereby said incremental motor moves from a first position to a second position with a minimum of oscillatory movement.

With this general outline of the invention, the specific construction of the invention may readily be understood by reference to the drawings wherein FIGURE 1 is a detail block diagram of the invention and FIGURE 2 is a graphical comparison of the output shaft movement of prior art devices and the invented device.

Referring to FIGURE 1, the improved motor control system includes an incremental motor 10 having an output shaft 12 which is coupled to capstan 14 to drive a web-like recording media 16. It should be understood that while the specific system described relates to a recorder employing a magnetic recording media the broader aspects of the invention are applicable to virtually any system employing an incremental motor or similar prime movers.

The output shaft 12 of incremental motor 10 has a means 13 coupled thereto for indicating the position of the output shaft 12 and more broadly for indicating the energization state of the motor windings when the shaft is free to move but not moving (not shown). The means 13 for indicating the winding energization state comprises a notched disk 18 operatively coupled to the output shaft 12 with a pair of illuminating means 20 and 22 located on one side of disk 18 while a pair of photocells 24 and 26 are located on the other side of disk 18. In the case of a four winding motor, properly positioning illuminating means 20 and 22 with respect to disk 18 and photocells 24 and 26 will result in signals being generated by photocells 24 and 26 representative of the energization state of the windings when the output shaft is in a stable position. It is possible to have fewer or additional photocells and illuminating means. It is also within the broad scope of the invention to employ electronic means not directly associated with the output shaft for sensing the state of energization of the windings as well as any other equivalent device such as a magnetic transducer and disk. The specific details of the operation of the means 13 shown in FIGURE 1 is discussed at length in copending U.S. patent application 401,825 filed on Oct. 6, 1964 by Michael J. Markakis now issued as U.S. Patent No. 3,324,369.

The photocells 24 and 26 are coupled to logic means 30 via amplifiers 32 and 34, and inhibit gates 36, 38, 40 and 42. Logic means 30 functions to enable the windings of the motor 10 to move or accelerate the output shaft in a first direction when a first energization signal is supplied via wire 52 or in a second direction when a second energization signal is supplied via wire 56. In general, logic means 30 consists of gates in the form of a gray code counter conditioned by inputs from 36, 38, 40, 42, which direct inputs supplied via wires 52 and 56 to cause the proper flip-flop 35 or 37 to change state. The state of flip-flops 35 and 37 determine the energization of the motor. The operation and construction of gray code counters are well known. In general such counters supply a pattern of signals which changes in a predetermined sequence each time an input signal is supplied. An inhibit gate is a well known logic means which will prevent an output from being transmitted when a predetermined set of conditions exists at its inputs. In the preferred embodiment gates 36, 38, 40 and 42 are controlled by a voltage level such as the output level from a one shot multivibrator. Another form of logic means 30 that may readily be adapted for use in this invention is described in detail in the above mentioned U.S. patent. Other logic means may readily be designed by one of ordinary skill in the art.

In operation, the logic means 30 conditions the flip-flops 35 and 37 which store the signals set by the first or second energization signals and maintained by the photocells 24 and 26 when the shaft is at rest. During the transition from one position to another the gates 36, 38, 40 and 42 are inhibited (as explained later in the specification) and allow the flip-flops to change their initial states when energized by a signal applied to conductor 43. At the conclusion of the movement of shaft 12 the inhibit gates are de-energized and the flip-flops will assume a state representative of the new energization state of the windings as controlled by the energized state of photocells 24 and 26. With the flip-flops 35, 37 conditioned by logic means 30, they will supply an output signal to each of the drive amplifiers 44–50 in a predetermined pattern. Every time a signal is supplied to logic means 30 via conductor 52 a new pattern of signals will be supplied to the drive amplifiers 44, 46, 48 and 50. The pattern of output signals is supplied to the amplifiers 44–50 in a predetermined sequence to cause movement in a first direction. In the case of a four winding motor logic means 30 will supply a predetermined sequence of four different patterns of signals when four properly timed and successive first energization signals are supplied to the logic means via conductor 52. Each new pattern of signals will result in the output shaft 12 moving to a new position. The new position is transduced by photocells 24 and 26 which conditions logic means 30 once gates 36–42 are no longer inhibited. From this it can be seen that applying successive first energization signals to the logic means via conductor 52 will result in the output shaft 12 stepping through various incremental positions. The application of a single first energization signal is facilitated by terminal 67 connected to OR circuit 66. The supplying of a single first energization signal results in movement of shaft 12 with undesirable terminal oscillations.

Similarly, the application of a second energization signal to conductor 56 will result in logic means 30 generating a pattern of signals that cause motor 10 to increment in a second or opposite direction. The application of second energization signals to logic means 30 is facilitated by terminal 55 and OR gate 62 connected to conductor 56. Thus, application of a first energization signal will cause motor 10 to increment in a first direction and application of a second energization signal will cause motor 10 to increment in a second direction. The energization signals may take various forms but are preferably pulse like signals.

Logic means 30 is connected to a means 54 for applying thereto a first energization signal, a second energization signal and a first energization signal in sequence via conductors 52 and 56 when it is supplied with a single step command via terminal 60. The first energization signal causes motor 10 to move and accelerate in a first direction, followed by the second energization signal causing acceleration in a second direction (or deceleration) and finally again applying a first energization signal to cause the movement of the output shaft 12 to terminate and lock in its new position. To accomplish this energization sequence the means 54 includes a first delay means 58 and second delay means 64. The first delay means 58 has its input connected to the input terminal 60 and its output connected to inhibit gates 36, 38, 40 and 42 via OR gate 68, to logic means 30 via the OR gate 62 and to second delay means 64. The second delay means 64 is connected to the logic means 30 via OR gate 66 and to the inhibit gates 36, 38, 40 and 42 via the OR gate 68. The delay means 58 and 64 may be a one shot multivibrator which first supplies a voltage level to gates 36–42 which are level sensitive gates while the levels are differentiated by gates 66 and 62 which pass pulses as a result of the level changes. The input terminal 60 is connected to logic means 30 via OR gate 66 and conductor 52 while input terminal 55 is connected to conductor 56 via OR gate 62.

In operation, an input signal is supplied to the input terminal 60 and then substantially simultaneously delay means 58 supplies a voltage level to inhibit gates 36–42 which locks out the signal supplied by photocells 24 and 26. The delay means 58 and 64 cooperate with OR gate 68 so that the inhibit gates 36, 38, 40 and 42 remain inhibited during essentially the entire period that shaft 12 is moving. This enables the flip-flops 35 and 37 to be altered without interferences by photocells 24 and 26. An instant after the inhibit gates are operated a pulse is supplied by gate 66 to the logic means 30 via the conductor 52, thus supplying a first energization signal thereto. This first energization signal results in the logic means 30 setting flip-flops 35 and 37 to energize the windings of motor 10 and accelerate the output shaft 12 to step in a first direction. Soon after the first energization signal is supplied by gate 66, the delay means 58 triggers the gate 62 to pass a second energization signal. Delay means 58 supplies this second energization signal about 3 milliseconds after the input signal is supplied thereto. This second energization signal causes the logic means 30 to energize the windings of motor 10 in a manner that tends to move the output shaft in a second direction resulting in the deceleration of the shaft 12. The second delay means 64 which receives a signal from the first delay means 58 supplies a first energization signal to the logic means 30 via conductor 52 a short period after the generation of the second energization signal, such as 2 milliseconds. This first energization signal supplied by delay means 64 tends to lock the output shaft 12 in its new incremental position.

The above structure (means 54) only increments the shaft 12 in one direction in accordance with the invention. The incrementing in the opposite direction is shown as being accomplished by applying signals to logic means 30 via terminal 55 and OR gate 62. It should be understood that means substantially identical to means 54 may be included to cause movement in a second direction in accordance with the invention.

The operation of the overall system can be more completely understood by reference to FIGURE 2 which is a graphical showing of the movement of output shaft 12 or capstan 14 as it moves from a first position to a new incremental position. The incremental movement of typical prior art systems is shown in FIGURE 2a curves 1–3. Curve 1 is for a system that has no damping other than that provided by the system element. In this system upon receipt of a step command the output shaft is accelerated to such an extent that it overshoots the desired new position and oscillates about this new position for a period of time until the oscillation diminishes to an acceptable level. The period of oscillation may last for 50 milliseconds. Curves 2 and 3 show systems with increased damping provided by additional braking means. As additional braking means is added (curve 1 to curve 2 to curve 3) the oscillations are attenuated but the time required to reach a new position is increased due to the additional load of the braking means.

The movement of the output shaft 12 in the invented system is shown in FIGURE 2(b). There the first energization signal which acts as the step command causes the output shaft to accelerate and the second energization signal after a delay causes the shaft to decelerate and approach a zero velocity as the shaft nears the new position. The final application of the first energization signal after the second delay serves to lock the shaft in its new position with a minimum of terminal oscillation. The total period for movement of the output shaft to a new position may typically require 5 milliseconds with periods of 3 milliseconds and less, possible with other special motors.

From the above it can be seen that a motor control system has been provided for energizing an incremental motor at an increased rate, with shorter incrementing periods, greater reliability and minimal terminal oscillation. The absence of terminal oscillation is particularly important in recorder systems where the recorded data must be precisely positioned with respect to a transducer so that reliable reproduction and locating is possible. The increased incrementing rates permits the data transfer rate to be increased.

While the above detailed description has shown, described and pointed out the fundamental novel features of the invention as applied to a preferred embodiment, it will be understood that various omissions and substitutions and changes in the form and details of the device illustrated may be made by those skilled in the art, without departing from the spirit of the invention. For example, it may be possible to employ one variable delay means which alternates between two different delays. Such a means may or may not include a feedback loop. In addition, a logic means may be provided which employs only one input conductor such as 52 or 56 and different level or polarity input signals. It is the intention, therefore, to be limited only as indicated by the scope of the following claims.

What is claimed is:

1. In a system including an incremental motor with a plurality of windings and an incremental motor control circuit, the combination comprising:
   a logic means for energizing said motor to move in a first direction when supplied with a first energization signal and for energizing said motor to accelerate in a second direction when supplied with a second energization signal;
   means for applying a first energization signal, a second energization signal and a first energization signal in sequence when the motor is to increment in the first direction and for supplying a second energization signal, a first energization signal and a second energization signal in sequence when said motor is to increment in a reverse direction, whereby said incremental motor moves from a first position to a second position with a minimum of terminal oscillatory movement.

2. In a recorder system having a web-like recording member, the combination comprising:
   moving means including an incremental motor for incrementally stepping the recording member in a forward direction and a reverse direction; and
   means for enabling said moving means to accelerate in a forward direction, a reverse direction and a forward direction in sequence during a single stepping by said motor, whereby said motor steps from a first position to a second position with a minimum of terminal oscillatory movement and in a relatively short period.

3. In a recorder system having a web-like recording member, the combination comprising:
   an incremental motor for incrementally stepping the recording member in a forward direction and a reverse direction; and
   means for energizing said motor to accelerate in a forward direction, a reverse direction and a forward direction in sequence during a single stepping by said motor, whereby said motor steps from a first position to a second position with a minimum of terminal oscillatory movement and in a relatively short period.

4. In an incremental motor control system including an incremental motor having a plurality of windings, wherein the operation of the system is divided into incremental moving periods, the combination comprising:
   a plurality of drive amplifiers coupled to respective windings of said motor;
   logic means coupled to said drive amplifiers for supplying a predetermined pattern of signals to said plurality of drive amplifiers in a first predetermined sequence upon the receipt of first successive signals, in a second predetermined sequence upon the receipt of second successive signals; and
   means for supplying a first energization signal, a second energization signal and then the first energization signal to said logic means during a single incremental moving period, said sequence of first, second, and first energization signals determining said first predetermined sequence, said second predetermined sequence and then said first predetermined sequence respectively during a single incremental period.

5. The structure defined in claim 4 wherein said means for supplying comprises:
   a first input terminal coupled to said logic means, said first input terminal adapted to receive the first energization signals;
   a second input terminal coupled to said logic means, said second input terminal adapted to receive the second energization signals;
   first means coupled to said first input terminal for supplying said first energization signals directly to said first input terminal;
   first delay means coupled to said second input terminal for supplying said second energization signals to said second input terminal after a delay; and
   second delay means coupled to said first input terminal for again supplying said first energization signals to said first terminal a selected time after said first delay means supplies said second energization signals to said second terminal.

6. The structure defined in claim 5, including means for applying a single step command signal to said means for supplying, wherein said first energization signal, said second energization signal and said first energization signal are sequentially supplied in response to the single step command signal.

7. In an incremental recorder control system, the combination comprising:
   an incremental motor having a plurality of windings and an output shaft that is incrementally moved from position to position in a selected direction when said windings are energized with a pattern of input signals in a predetermined sequence;
   drive amplifier means coupled to said windings for energizing said windings in accordance with the pattern of input signals introduced thereto;
   logic means coupled to said drive amplifier means for supplying the predetermined sequence of input signal patterns thereto, each of the input signal patterns comprising a plurality of separate signals, said logic means including a pair of flip-flops coupled to said drive amplifier means for assuming states representative of the energization state of the motor windings; and
   energization supply means coupled to said logic means to sequentially generate and supply to the logic means one of said plurality of separate signals, terminate said signals and then again apply said signals, to thereby move the output shaft of the incremental motor in a first direction, decelerate the shaft and then lock the shaft in its new position, said energization supply means including first gate means coupled to said logic means for introducing thereto a first energization signal, first delay gate means coupled to said logic means for introducing thereto a first delayed energization signal, and second delay gate means coupled to said logic means for again introducing thereto said first energization signal a selected time interval after said first delayed energization signal.

8. The structure defined in claim 6 further including position indicating means coupled to the output shaft of said motor for producing signals indicating the energization state of the windings of said motor when said shaft is in a stable position, and inhibit means coupled between said position indicating means and said logic means for inhibiting the signals from said position indicating means to said logic means during a selected time interval.

References Cited

UNITED STATES PATENTS

| | | | |
|---|---|---|---|
| 2,793,335 | 5/1957 | Woodruff | 318—13 |
| 2,954,514 | 9/1960 | Hemstreet | 318—28 |
| 3,051,883 | 8/1962 | Smith | 318—448 |
| 3,127,548 | 3/1964 | Van Emden | 310—49 XR |
| 3,243,677 | 3/1966 | Cannalte et al. | 318—138 |

ORIS L. RADER, *Primary Examiner.*

G. R. SIMMONS, *Assistant Examiner.*